United States Patent [19]

Escamilla et al.

[11] Patent Number: 4,838,153
[45] Date of Patent: Jun. 13, 1989

[54] METHOD AND APPARATUS FOR FORMING AND BAKING FLAT, THIN DISCS OF DOUGH

[75] Inventors: Robert M. Escamilla, San Antonio; Elias Escamilla, III, Helotes; Elias Escamilla, Jr., San Antonio; Gregg E. Johnson, Boerne; Robert M. Arnold; Thomas Tatner, both of San Antonio, all of Tex.

[73] Assignee: Bakery Equipment and Service Co., Inc., San Antonio, Tex.

[21] Appl. No.: 206,805

[22] Filed: Jun. 15, 1988

Related U.S. Application Data

[63] Continuation-in-part of Ser. No. 103,291, Oct. 1, 1987, Pat. No. 4,769,252.

[51] Int. Cl.⁴ .............................................. A47J 39/04
[52] U.S. Cl. ......................................... 99/349; 99/353; 99/395; 99/423
[58] Field of Search .............. 99/353, 443 R, 443 C, 99/386, 393, 395, 423, 448, 449, 427, 355; 426/496, 502, 512, 523; 100/156, 210; 425/397, 406

[56] References Cited

U.S. PATENT DOCUMENTS

| | | | |
|---|---|---|---|
| 3,223,053 | 12/1965 | Jimenez | 99/353 |
| 3,397,655 | 8/1968 | Valadez et al. | 99/349 X |
| 4,197,792 | 4/1980 | Mendoza | 99/427 X |
| 4,241,648 | 12/1980 | Longenecker | 99/349 |
| 4,365,547 | 12/1982 | McClure | 425/407 |
| 4,504,209 | 3/1985 | Skloss | 99/353 X |
| 4,508,025 | 4/1985 | Schultz | 99/443 C |
| 4,510,165 | 4/1985 | Caridis et al. | 99/427 X |
| 4,567,819 | 2/1986 | Adamson | 99/443 C |

Primary Examiner—Timothy F. Simone
Attorney, Agent, or Firm—Hubbard, Thurman, Turner & Tucker

[57] ABSTRACT

A combination pressing and initial baking system is provided for converting balls of dough into thin, flat discs, such as tortillas. A box-like support structure is provided having a portion of its frontal wall open and defining a mounting for a first heated pressing plate with its dough contacting face facing downwardly and disposed at a substantial angle to the horizontal. A second heated pressing plate is mounted on horizontal pivots in the box-like support structure for pivotal movement between a pressing position adjacent to and parallel with the downwardly facing surface of the first pressing plate, and a feeding position where the upper ends of the pressing plates are spaced apart to permit the insertion of a ball of dough therebetween. Movement of the second pressing plate to its pressing position effects the pressing and initial baking of the dough in a flat disc shape. The heat input to the dough disc during pressing determines the peripheral area and thickness of the resulting disc. The angle of the second pressing plate relative to the horizontal is always sufficiently large to effect the gravitationally induced sliding of the pressed disc of dough off the second pressing plate and onto a suitable conveyor, for transport into an oven to complete the baking of the disc. The first pressing plate is pivotally mounted on the box-like support structure to permit it to be moved to a position exposing the dough contacting surfaces of both pressing plates for cleaning.

26 Claims, 3 Drawing Sheets

4,838,153

METHOD AND APPARATUS FOR FORMING AND BAKING FLAT, THIN DISCS OF DOUGH

RELATIONSHIP TO OTHER CO-PENDING APPLICATIONS

This application constitutes a continuation-in-part of application Ser. No. 07-103,291, filed Oct. 1, 1987, Pat. No. 4,769,252 and assigned to the assignee of this application.

BACKGROUND OF THE INVENTION

1. Field of the Invention

This invention relates to an apparatus for producing thin discs of dough which can be subsequently baked to form tortillas, pizza shells, pita bread, or the like and particularly to an apparatus for pressing such thin flat discs from a ball or patty of dough.

2. History of the Prior Art

Baked products in the form of flat discs of dough have long been utilized for the manufacture of tortillas, pizza shells, pita bread, or the like. Particularly in the case of tortillas, which are fabricated from a flour mix, it has been the common practice to fabricate the flour mix in the form of balls of dough, insert each ball of dough between a lower pressing plate and a vertically spaced upper plate, and then bring the two pressing plates into juxtaposition to squeeze the ball of dough into the desired thin disc shape. On the other hand, pizza shells are commonly formed by feeding a ball or patty of dough between the nip of two smooth-surfaced rollers which act on the dough to reduce it to the desired thickness.

The mechanization of the dough disc-forming operation is obviously desirable, and there are numerous examples in the prior art of attempts to achieve such mechanization. See for example, U.S. Pat. No. 3,397,655 to VALADEZ et al, U.S. Pat. No. 3,223,053 to JIMENEZE et al, U.S. Pat. No. 4,241,648 to LONGNECKER, and U.S. Pat. No. 4,508,025 to SCHULTZ. None of these prior art apparatus has been completely satisfactory from the standpoint of uniform thickness of the resulting dough disc, ease of removal of the pressed dough disc, and ease of cleaning dough deposits from the pressing plates which inherently adhere to the disc, which are normally heated during the pressing operation.

Additionally, prior art dough pressing systems required adjustment of the spacing of the pressing plates to accomplish any significant change in thickness and eripheral size of the pressed disc.

SUMMARY OF THE INVENTION

This invention contemplates the formation of a thin disc of dough from a ball or patty of dough through the cooperation of two heated pressing plates which are relatively movable in a generally vertical plane. Preferably, a box-like support structure is provided for mounting the two pressing plates. The support structure has a partially open frontal wall and the side walls of such open portion define a mounting for an upper pressing plate which, in operation, is secured thereon with its generally planar, dough contacting surface facing downwardly and disposed at a substantial angle to the horizontal. Such angle is selected to be in excess of the horizontal angle required to effect the gravitational discharge of a pressed disc of dough from a cooperating second pressing plate.

The second lower pressing plate is pivotally mounted within the box-like support structure and is movable from a remote position, in which a ball or patty of dough may be inserted between the the two pressing plates, to a pressing position wherein the dough contacting surfaces of the plates are disposed in closely spaced, juxtaposed relationship. In all operating positions of the second or lower plate, such plate is disposed with its upwardly facing, dough contacting surfaces disposed at a substantial angle to the horizontal such that, when relative movement of the second plate to the remote position is initiated after the dough pressing operation, the disc of dough on the upwardly facing surface of the lower plate will slide off such lower plate due to gravitational forces acting on the disc. Preferably, both pressing plates are heated so that the disc is preliminarily baked while compressed between the two pressing plates, at least to the extent of forming a crust on both surfaces of the formed dough disc.

The lower pressing plate is periodically shifted from its remote position to its pressing position with respect to the upper plate by a motor driven rotary cam unit which is disposed within the box-like support structure. The lower pressing plate is gravitationally biased into engagement with the cam. Horizontal adjustments of the motor driven rotary cam unit relative to the box-like support structure are provided so as to permit convenient adjustment of the spacing between the pressing plates in the remote position. The lower end of the lower pressing plate is pivotally mounted to pivot pins provided on opposite sides of the base of the box-like support structure and the position of such pivot pins is also adjustable. Thus, the opening between the pressing plates when disposed in their remote position may be conveniently adjusted to receive dough balls of varying sizes, and similarly, the spacing between the pressing plates when in their juxtaposed adjacent position may be conveniently adjusted to produce a pressed disc of the desired thickness. The lower end of at least one of the pressing plates is beveled to provide adequate clearance for the gravitational discharge of the pressed dough disc.

A further feature of this invention lies in the pivotal mounting of the upper pressing plate to one side wall of the box-like support structure so that such pressing plate may be pivoted relative to the support structure to expose both dough contacting pressing surfaces of the two pressing plates for cleaning purposes. Once the upper pressing plate is pivoted to at least a vertical position, the lower pressing plate may be also pivoted upwardly through the open frontal end portion of the box-like support structure to further facilitate cleaning.

Lastly, this invention provides a simple method for varying the thickness and peripheral extent of the pressed disc which does not involve changing the size of the dough ball or the spacing of the pressing surfaces. Such method involves varying the amount of heat introduced into the pressed disc during the dwell period of the pressing operation. The greater the amount of heat, the larger and thinner the pressed disc becomes, primarily due to the fact that the preliminary baking of the dough comprising the opposed surfaces of the pressed dough disc opposes the amount of resilient recovery of the dough when the pressing force is removed.

Such variation of heat input may be conveniently accomplished by varying the temperature of the pressing surfaces, but this requires time to accomplish. An immediate change in thickness and perimetral extent of the dough disc is accomplished by varying the pressing dwell time. This is conveniently accomplished almost instantaneously by changing the speed of the rotary cam unit which controls the position of the lower pressing plate, hence determines the pressing dwell time.

Other objects and advantages of this invention will be readily apparent to those skilled in the art from the following detailed description, taken in conjunction with the annexed sheets of drawings, on which is shown a preferred embodiment of the invention.

DESCRIPTION OF PREFERRED EMBODIMENT

Figure 1:
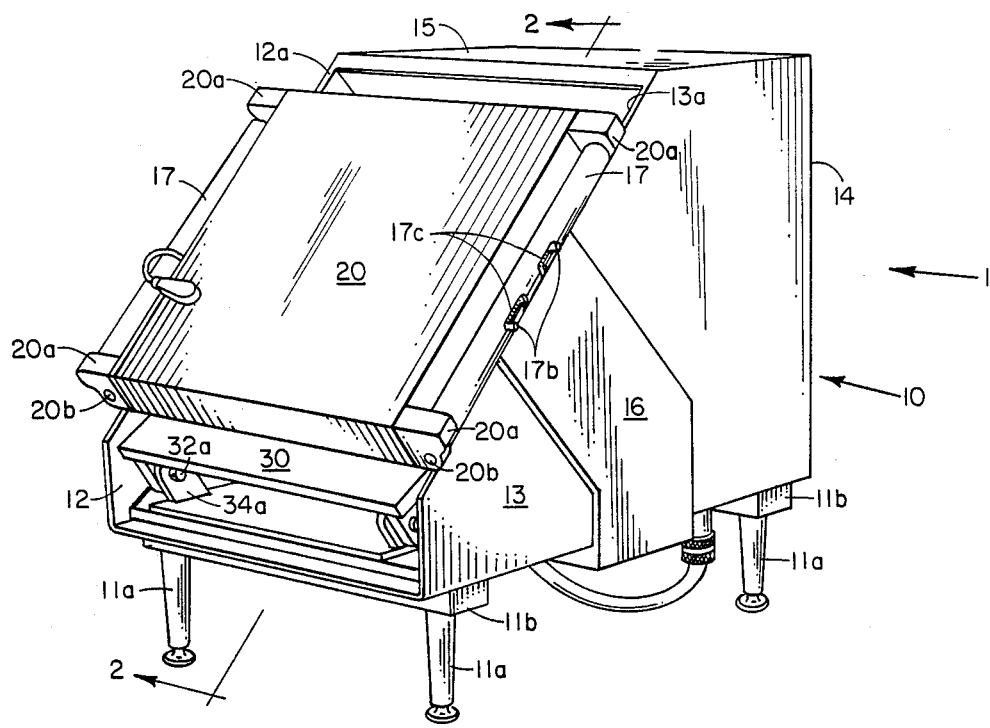
FIG. 1 is a perspective view of a pressing mechanism embodying this invention, with the elements of the invention shown in their pressing positions.

A pressing mechanism 1 embodying this invention is incorporated in a box-like structure 10 having a bottom wall 11 supported by adjustable legs 11a. The frontal wall of the boxlike structure 10 is open and the opposed side walls 12 and 13 are respectively provided with inclined top surfaces 12a and 13a for supporting an upper pressing plate 20 in a vertically inclined position defining a substantial angle with respect to the horizontal. Rear wall 14 and an abbreviated top wall 15 complete the box-like support structure 10. Support legs 11a may be provided which are secured to depending channels 11b secured to bottom wall 11.

Figure 2B:
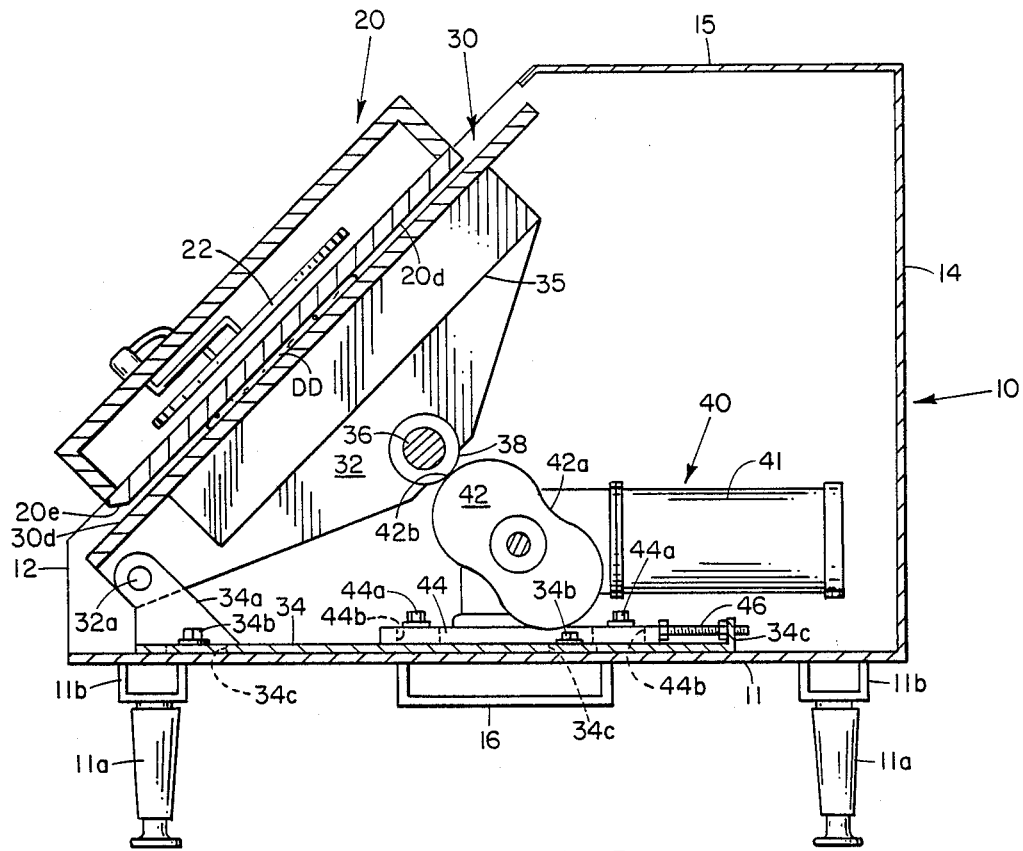
FIG. 2B is a view similar to FIG. 2A but showing the pressing plates in their pressing position.
Figure 2A:
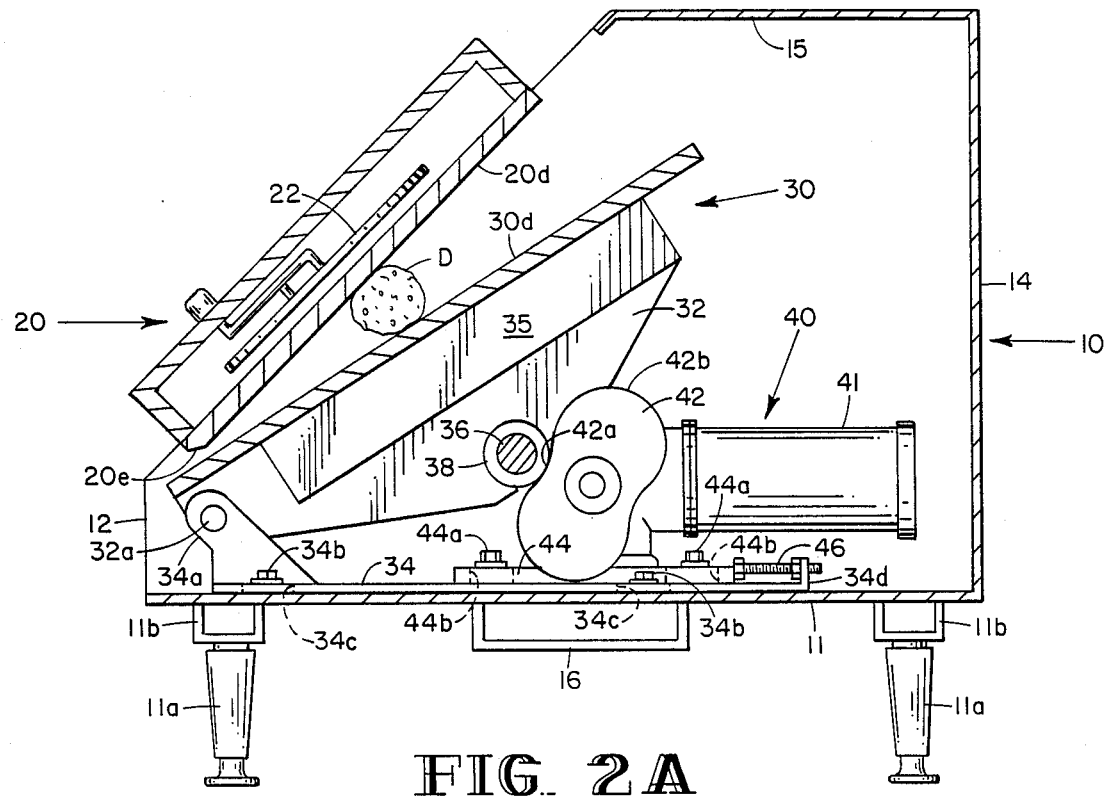
FIG. 2A is a sectional view taken on the plane 2—2 of FIG. 1, showing the pressing plates in their open position.

As best shown in FIG. 2A, upper pressing plate 20 is provided at all four corners with integral, substantially identical projecting lugs 20a which in turn define apertures 20b. The lugs 20a provided on the left hand side of the upper plate 20, as viewed in FIG. 2, receive axially shiftable plungers (not shown) which are supported within a pivot sleeve 17 secured to the inclined top surface 12a of the side wall 12. Alternatively, sleeve 17 may be formed on the top surface of a U-shaped reinforcing frame 16 which is suitable secured to side walls 12 and 13 and bottom wall 11.

Figure 3:
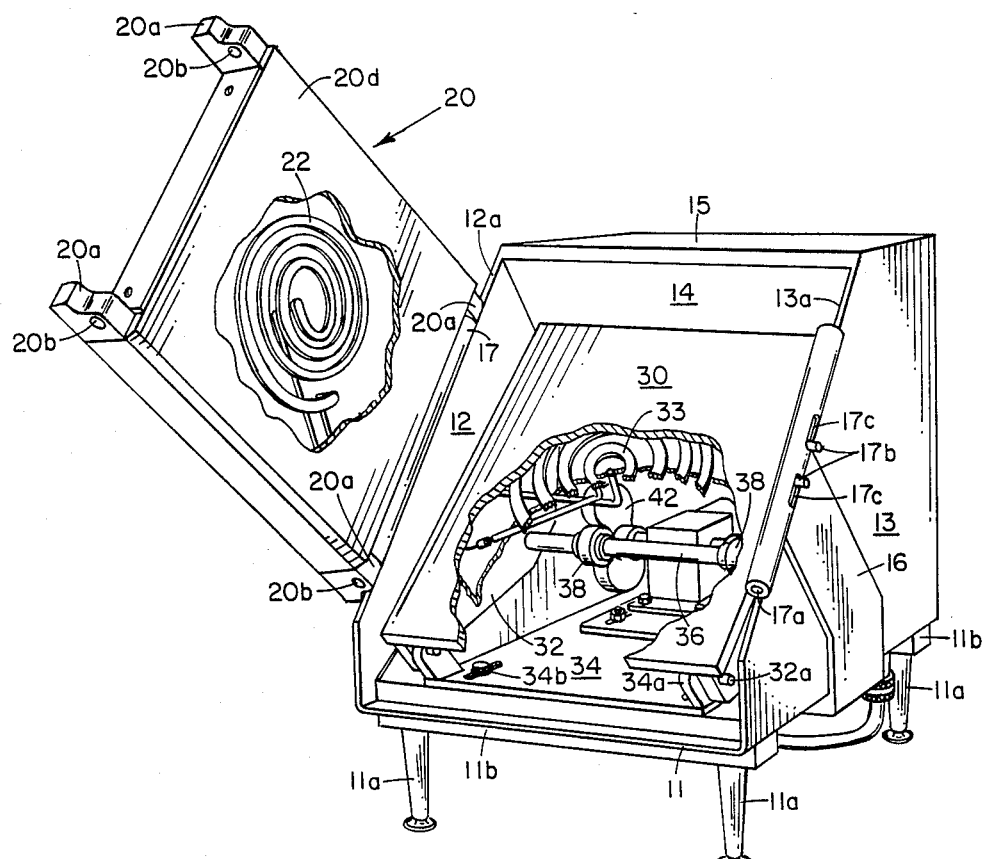
FIG. 3 is a perspective view, similar to FIG. 1 but showing the upper pressing plate pivoted to a substantially vertical position to provide access to the dough contacting surfaces of the pressing plates for cleaning purposes.

On the top edge 13a of side wall 13, or preferably on the other top edge of reinforcing frame 16, another tubular pivot sleeve 17, is welded or suitably secured, and this sleeve mounts a pair of axially shiftable, spring pressed plungers 17a which respectively engage the apertures 20b provided on the right hand side of the upper pressing plate 20, as viewed in FIG. 3. Similar plungers are provided in sleeve 17 to secure the left side of the upper pressing plate to the pivot sleeve 17. The locking plungers 17a are respectively spring biased outwardly to engage the apertures 20b and may be manually retracted by the operator squeezing together and rotating radially disposed pins 17b secured to the inner ends of the locking plungers 17a which project outwardly through right angle slots 17c. Thus either or both sides of upper pressing plate 20 may be pivotally secured to support structure 10.

In operation, the upper pressing plate 20 is rigidly secured to the inclined frontal wall portions 12a and 13a of the box-like support structure 10 in the position illustrated in FIG. 1. Alternatively, by releasing the plungers 17a from either the right hand set of apertures 20b on the upper pressing plate 20, or the left hand set of apertures 20b, such plate can be pivoted to at least a 90° position relative to the support structure for cleaning purposes, as illustrated in FIG. 3. It will readily be apparent that a lower pressing plate 30, which will be described in detail, is also thus exposed for cleaning.

Upper pressing plate 20 is of conventional construction and it is preferably hollow. It defines a planar pressing surface 20d which is disposed in a downwardly facing position when the upper pressing plate 20 is locked to the box-like support structure 10, as shown in FIG. 1. An electrically controlled heating element 22 is incorporated within the interior of the pressing plate 20 and maintains the dough contacting pressing surface 20d at a desired temperature, which is normally in the range of 350° to 450° F.

As best shown in FIGS. 2A and 2B, the lower pressing plate 30 is provided along each side with an integrally secured depending mounting flange 32. The forward end of each mounting flange 32 mounts a transversely disposed pivot pin 32a which respectively engage suitable apertures provided in a pair of laterally spaced, upstanding ears 34a provided on a bottom plate 34 which rests on the bottom wall 11 of the box-like support structure 10 and is adjustably secured thereto by bolts 34b and slots 34c. Thus, the lower pressing plate 20 is pivotally movable about a horizontal axis. Its exact angular position is controlled by a motor driven rotary cam unit 40 which comprises a cam 42 driven at a selected speed by a variable speed electric motor 41. The motor driven rotary cam unit 40 is adjustably mounted on the bottom wall 11 of the box-like support structure 10 by a plurality of bolts 44a which extend through the bottom wall 11 and traverse elongated slots 44b provided in the base 44 of the motor driven rotary cam unit 40. Any desired longitudinal position of the motor driven rotary cam unit 40 may be selected by loosening the bolts 44a and then adjusting an adjustment screw 46 which operates between the rear end of the base 44 and an upstanding rear wall portion 34d provided on the bottom plate 34. The depending mounting flanges 32 mount a transverse shaft 36 on which are mounted a pair of axially spaced rollers 38 which respectively engage the peripheral surfaces 42a of the motor driven rotary cams 42. It will be obvious that the lower pressing plate 30 is gravitationally biased to maintain the rollers 38 in engagement with the camming surfaces 42a.

The lower pressing plate 30 has an upwardly facing planar dough contacting surface 30d. That portion of the surface 30d which normally performs the pressing operation on a ball of dough is heated by an electric heating unit 33 disposed within a box-like cover 35 which is secured to the bottom face of the lower pressing plate 30. The temperature of the heating unit 33 is conventionally controlled to produce a selected temperature of the pressing surface 30d in the range of 350°–450° F.

From the foregoing description, it will be apparent that the pressing position of the lower pressing plate 30 relative to the upper pressing plate 20 is determined by first adjustment of the bottom support plate 34 which effectively moves the pivot pins 32a forwardly or rearwardly relative to the box-like supporting structure hence, moving the pivotal axis of the lower pressing plate 30 relative to the upper pressing plate 20. Additionally, the lower pressing plate 30 is movable by the motor driven rotary cams 42 from the closely adjacent pressing position shown in FIG. 2B to a remote, dough ball inserting position shown in FIG. 2A wherein the upper portions of the lower pressing plate 30 are spaced away from the upper pressing plate 20 to permit a ball or patty of dough D to be manually or otherwise inserted through the upper portion of the open frontal wall of the boxlike supporting structure 10 to slide downwardly between the angularly disposed pressing plates 20 and 30 until trapped in a medial position therebetween. The extent of the angular separation of the pressing plates 20 and 30 in order to permit convenient feeding of a ball of dough therebetween is controlled by the configuration of the motor driven rotary cam units 42.

The lower pressing plate 30 is then shifted by the rotary cam units 42 to the pressing position illustrated in FIG. 2B wherein the planar dough contacting surfaces 20d and 30d of the upper and lower pressing plates 20 and 30 respectively are disposed in a closely adjacent juxtaposed relationship to effect the desired amount of pressing of the dough ball between such surfaces to produce a dough disc DD.

It should be particularly noted that in all angular positions of the lower pressing plate 30, the angular inclination of the dough contacting surface 30d is sufficiently great that the pressed dough disc DD will freely slide by gravity off of such pressing surface 30d, in the manner described and claimed in the above referred to co-pending parent application. In order to provide adequate clearance for such gravitationally induced discharge movement of the pressed dough disc, the lowermost corner 20e of the upper pressing plate 20 is preferably beveled.

The pressed dough disc is discharged through the lower open portion of the open frontal wall of the boxlike support structure 10 wherein it is deposited on a suitable conveyor or upon a rotating disc of an oven in the manner described in the aforementioned parent application.

An outstanding feature of the aforedescribed apparatus lies in the fact that the thickness or peripheral extent of the pressed dough disc may be varied through a substantial range without necessitating a change in position of the rotary driven cam units 42 or the pivot pins 32a which effect the mounting of the lower end of the lower pressing plate 30 to the box-like structure 1. Such variation in thickness and peripheral extent of the pressed dough disc is accomplished in accordance with this invention by maintaining the spacing between the dough contacting surfaces 20d and 30d of the pressing plates 20 and 30 at a fixed distance while varying the amount of heat inputted into the pressed dough disc while the aforementioned dough contacting surfaces 20d and 30d remain in their pressing position. This pressing position corresponds to a dwell surface portion 42b provided on the camming surface 42a of the motor driven rotary cams 42. The cam dwell portion 42b maintains a substantially constant radius relative to the rotary axis of the rotary cams 42 and hence does not change the spacing of the dough contacting surfaces 20d and 30d of the pressing plates 20 and 30. By varying the speed of rotation of the cam units 42, the amount of heat absorbed by the pressed dough disc may be conveniently varied. Thus, if a thinner dough disc, hence a disc having a larger perimeter, is desired, the rotational speed of the cam units 42 would be decreased. If a thicker dough disc is desired, the rotational speed would be increased, thus reducing the heat input to the pressed dough disc.

Such heat input effects a partial baking of the planar surfaces of the pressed dough disc and prevents the inherent tendency of the dough disc to resiliently retract to its original configuration.

A similar effect may be produced by varying the temperature of the dough contacting surfaces 20d and 30d. The maintenance of a higher temperature on such surfaces will increase the amount of heat input into the pressed dough disc and result in a thinner, and larger perimeteral area of the resulting disc. A lower temperature will result in a thicker dough disc having a smaller perimeteral area. If desired, both adjustments can be made concurrently, but it should be noted that the adjustment of the rotary speed of the cams 42 produces an immediate change in the heat input into the pressed dough disc, while varying the temperature of the dough contacting surfaces 20d and 30d requires a longer time to be effective.

Figure 5:
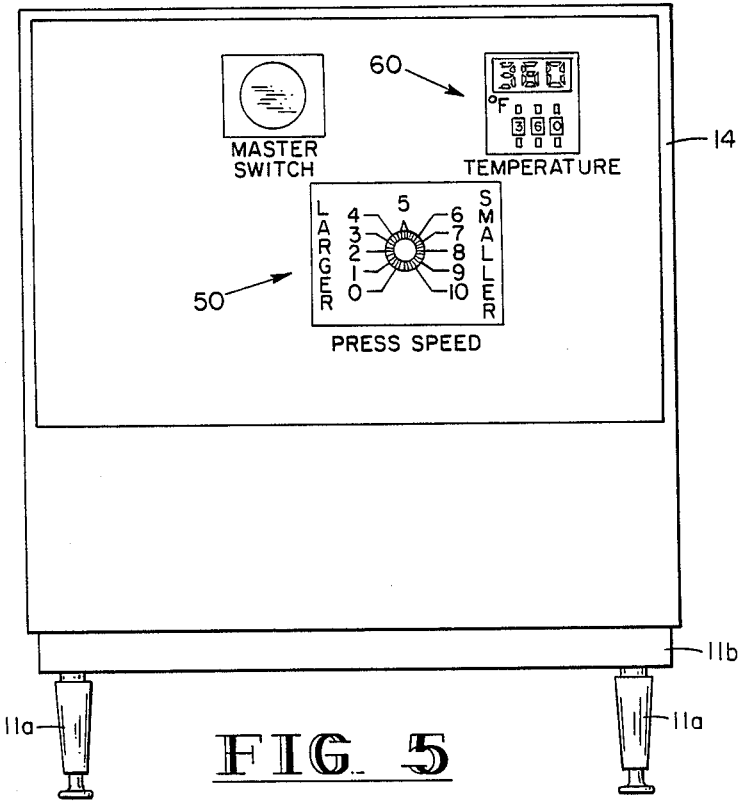
FIG. 5 is a rear view of FIG. 1.

Conventional controls are provided for varying the speed of the rotary cams and the temperature of the dough contacting surfaces of the pressing plates. See speed control 50 and temperature control 60 in FIG. 5.

Figure 4:
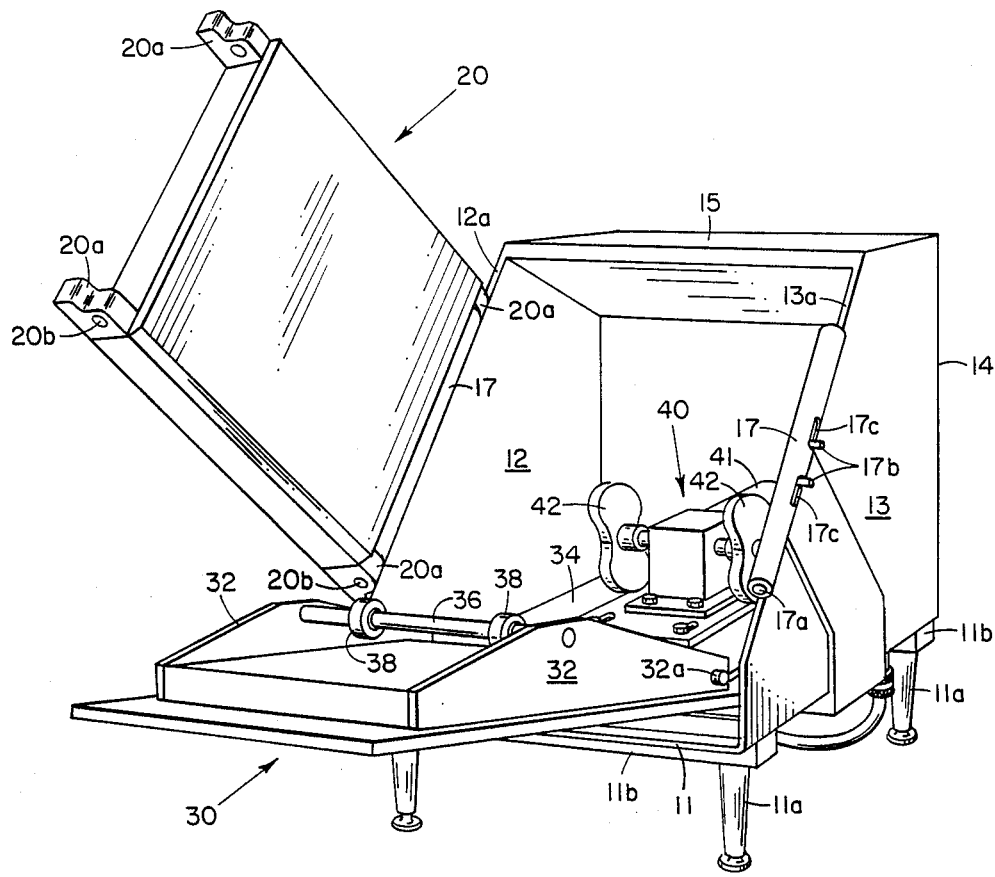
FIG. 4 is a view similar to FIG. 3 but showing the movement of the lower pressing plate out of the surrounding support structure for cleaning purposes.

The dough contacting surfaces 20d and 30d of the cooperating pressing plates 20 and 30 are preferably coated with any one of several known anti-stick coatings, the primary ingredient of which is a tetrafluroethylene compound. A number of such compounds are available in the marketplace and hence further description thereof is unnecessary. Notwithstanding the use of a non-stick compound, the dough contacting surfaces 20d and 30d eventually require cleaning to remove dough particles that have adhered and baked themselves onto the dough contacting surfaces. Such cleaning is conveniently effected by raising the upper pressing plate 20 to a position of at least 90° relative to its pressing position, thus providing access to the dough contacting surface 20d thereof for cleaning purposes and, concurrently opening the interior of the box-like support structure 10 for access to the dough contacting surface 30d of the lower pressing plate 30. If additional access to the lower pressing plate 30 is desired, it may be manually lifted to a vertical position projecting out of the interior of the box-like supporting structure 1 in the manner illustrated in FIG. 4.

It will therefore be readily apparent to those skilled in the art that the aforedescribed method and apparatus for effecting the pressing of balls or patties of dough into a disc-like configuration provides an unusual degree of control over the thickness and perimeteral extent of the resulting dough disc through the convenient adjustment of either the temperature of the pressing plate or the rotary speed of the motor driven rotary cam unit 40. This flexibility permits the operator to readily adjust for inconsistencies that are normally encountered in successive batches of dough and to produce a substantially uniform pressed product having a thickness and a perimeteral extent substantially equal to discs previously produced, even though the dough mix has undergone a significant variation.

Although the invention has been described in terms of specified embodiments which are set forth in detail, it should be understood that this is by illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed and desired to be secured by Letters Patent is:

1. Apparatus for forming dough balls into a flat disc shaped configuration comprising:
   a box-like support structure having an open frontal wall portion with horizontally inclined, upwardly facing side wall surfaces;
   a first pressing plate defining a first planar dough contacting surface;
   means for securing said first pressing plate on said horizontally inclined, side wall surfaces as a non-vertical frontal wall portion of said box-like support structure with said planar dough contacting surface facing downwardly at a selected angle to the horizontal;
   a second pressing plate defining a second planar dough contacting surface;
   means for shiftably mounting said second pressing plate in said box-like support structure with said second planar dough contacting surface facing upwardly and movable between a first position and a second position relative to said first planar dough contacting surface;
   in said first position, said second planar dough contacting surface being angularly disposed relative to said first planar dough contacting surface with the lower ends of said planar dough contacting surfaces being closely adjacent, whereby a ball of dough dropped between the upper ends of said planar dough contacting surfaces will be trapped between the medial portions of said planar dough contacting surfaces;
   in said second position, said planar dough contacting surfaces being parallel and spaced apart by a distance corresponding to the desired thickness of the pressed disc of dough;
   said selected angle being greater than that required to gravitationally release and discharge the pressed disc of dough while said second pressing plate returns from said second position to said first position; and
   said open frontal wall portion having a dough ball feeding opening above said first pressing plate and a dough disc discharge opening below said first pressing plate.

2. The apparatus of claim 1 wherein said first and second planar dough contacting surfaces are heated to a temperature on the order of 400° F.

3. The apparatus of claim 1 wherein said second pressing plate is pivotally mounted within said box-like support structure for movement about a horizontal axis between said first and second positions, thereby being gravitationally biased to said first position.

4. The apparatus of claim 3 further comprising motor driven cam means mounted in said box-like support structure for periodically moving said second pressing plate between said first and second positions.

5. The apparatus of claim 1 wherein one of said pressing plates has a beveled edge at the lower end of said one pressing plate to provide clearance for discharge of the pressed dough disc as said second plate returns from said second position to said first position.

6. The apparatus of claim 5 further comprising motor driven rotary cam means mounted in said box-like support structure for periodically moving said second pressing plate between said first and second positions.

7. The apparatus of claim 6 further comprising means for adjusting the speed of said rotary cam means, thereby producing adjustment of the thickness and peripheral size of the pressed dough disc.

8. The apparatus of claim 1 further comprising means for adjusting the temperature of said planar dough contacting surfaces.

9. The apparatus of claim 1 wherein said second planar dough contacting surface is disposed in all positions intermediate said first and second positions at an angle to the horizontal large enough to produce a gravitational discharge of the pressed dough disc from said second planar dough contacting surface of said second pressing plate.

10. The apparatus of claim 1 wherein said means for securing said first pressing plate to said box-like support structure includes means for pivoting said first pressing plate upwardly relative to said box-like support structure to at least a vertical position to expose both planar dough contacting surfaces for cleaning.

11. The apparatus of claim 10 wherein said second pressing plate is horizontally pivotally mounted in said boxlike support structure to permit upward pivotal movement of said second pressing plate through said open frontal wall portion for cleaning purposes whenever said first pressing plate is pivoted upwardly to at least a vertical position.

12. Apparatus for forming dough balls into a flat disc shaped configuration comprising:
    a box-like support structure having an open frontal wall;
    a first pressing plate defining a first planar dough contacting surface;
    means for securing said first pressing plate on said box-like support structure as a non-vertical frontal wall portion thereof with said planar dough contacting surface facing downwardly at a selected angle to the horizontal;
    a second pressing plate defining a second planar dough contacting surface;
    means for shiftably mounting said second pressing plate in said box-like support structure with said second planar dough contacting surface facing upwardly and movable between a first position and a second position relative to said first planar dough contacting surface;
    in said first position, said second planar dough contacting surface being angularly disposed relative to said first planar dough contacting surface with the lower ends of said planar dough contacting surfaces being closely adjacent, whereby a ball of dough dropped between the upper ends of said planar dough contacting surfaces will be trapped between the medial portions of said planar dough contacting surfaces;
    in said second position, said planar dough contacting surfaces being parallel and spaced apart by a distance corresponding to the desired thickness of the pressed disc of dough;

said selected angle being greater than that required to gravitationally release and discharge the pressed disc of dough while said second pressing plate returns from said second position to said first position; and said securing means including means for pivoting said first pressing plate relative to said box-like support structure to expose both of said planar dough contacting surfaces for cleaning.

13. The apparatus of claim 12 wherein said first and second planar dough contacting surfaces are heated to a temperature on the order of 400° F.

14. The apparatus of claim 12 wherein said second pressing plate is pivotally mounted within said box-like support structure for movement about a horizontal axis between said first and second positions, thereby being gravitationally biased to said first position.

15. The apparatus of claim 14 further comprising motor driven rotary cam means mounted in said box-like support structure for periodically moving said second pressing plate between said first and second positions.

16. The apparatus of claim 12 wherein one of said pressing plates has a beveled edge at the lower end of said one pressing plate to provide clearance for discharge of the pressed dough disc as said second plate returns from said second position to said first position.

17. The apparatus of claim 15 further comprising means for adjusting the speed of said rotary cam means, thereby producing adjustment of the thickness and peripheral size of the pressed dough disc.

18. The apparatus of claim 12 further comprising means for adjusting the temperature of said planar dough contacting surfaces.

19. The apparatus of claim 12 wherein said second planar dough contacting surface is disposed in all positions intermediate said first and second positions at an angle to the horizontal large enough to produce a gravitational discharge of the pressed dough disc from said second planar dough contacting surface of said second pressing plate.

20. The apparatus of claim 12 wherein said box-like support structure has a first opening to permit a dough ball to be inserted between said pressing plates in said first position, and a second opening to permit gravitationally produced discharge of the pressed dough disc from said second pressing plate while moving from said second position to said first position.

21. Apparatus for forming dough balls into a flat disc shaped configuration comprising:

a hollow support structure;

a first pressing plate defining a first dough contacting surface;

means for securing said first pressing plate on said hollow support structure to form a horizontally inclined wall thereof with said first dough contacting surface facing downwardly;

said securing means including pivot means adjacent one edge of said first pressing plate permitting said first pressing plate to be pivoted outwardly relative to said hollow support structure to a cleaning position;

a second pressing plate having an upwardly facing dough contacting surface;

means for shiftably mounting said second pressing plate within said hollow support structure for movement between a first position wherein said dough contacting surfaces are angularly spaced apart sufficiently to receive and trap a dough ball therebetween; and a second position wherein said dough contacting surfaces are in closely spaced parallel relationship to press the dough ball into a flat disc, said upwardly facing dough contacting surface of said second pressing plate being disposed at an angle to the horizontal during movement from said first position to said second position sufficient to gravitationally discharge the pressed dough disc therefrom during said movement.

22. The apparatus of claim 21 wherein said second pressing plate is horizontally pivotally mounted to said hollow support structure and movable out of said hollow support structure for cleaning when said first pressing plate is pivoted to said cleaning position.

23. The apparatus of claim 21 further comprising means for heating said first and second dough contacting surfaces to a temperature in the range of 350°–450° F.

24. The apparatus of claim 23 further comprising motor driven rotary cam means mounted in said hollow support structure for periodically moving said second pressing plate between said first and second positions.

25. The apparatus of claim 24 further comprising means for adjusting the speed of said rotary cam means, thereby permitting adjustment of the thickness of the pressed dough disc.

26. The apparatus of claim 25 further comprising means for adjusting the horizontal position of said motor driven cam means relative to said pivot mounting of said second pressing plate.

* * * * *